(12) United States Patent
Nakai et al.

(10) Patent No.: US 6,768,511 B1
(45) Date of Patent: Jul. 27, 2004

(54) EXPOSURE CONTROL CIRCUIT FOR SOLID-STATE IMAGING APPARATUS

(75) Inventors: Tomomichi Nakai, Ogaki (JP); Toshio Nakakuki, Gifu-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/495,419

(22) Filed: Jan. 31, 2000

(30) Foreign Application Priority Data

Feb. 1, 1999 (JP) .......................................... 11-023882

(51) Int. Cl.⁷ .......................... H04N 5/235; H04N 9/73; H04N 1/46; G03B 7/00
(52) U.S. Cl. ............................... 348/229.1; 348/223.1; 348/362; 358/516
(58) Field of Search .......................... 348/223.1, 225.1, 348/226.1, 228.1, 229.1, 230.1, 312, 362, 296; 358/516, 518, 520

(56) References Cited

U.S. PATENT DOCUMENTS

| | | | | |
|---|---|---|---|---|
| 5,040,070 A | * | 8/1991 | Higashitsutsumi et al. | . 348/298 |
| 5,258,848 A | * | 11/1993 | Kondo et al. | 348/229.1 |
| 5,293,238 A | * | 3/1994 | Nakano et al. | 348/226.1 |
| 5,386,231 A | * | 1/1995 | Shimizu et al. | 348/296 |
| 5,448,293 A | * | 9/1995 | Kogane et al. | 348/229.1 |
| 5,512,950 A | * | 4/1996 | Watanabe et al. | 348/297 |
| 5,579,049 A | * | 11/1996 | Shimaya et al. | 348/364 |
| 5,604,537 A | * | 2/1997 | Yamazaki et al. | 348/350 |
| 5,793,422 A | * | 8/1998 | Mochizuki et al. | 348/296 |
| 6,081,294 A | * | 6/2000 | Cooper | 348/221.1 |
| 6,100,928 A | * | 8/2000 | Hata | 348/229.1 |
| 6,163,342 A | * | 12/2000 | Suzuki | 348/364 |
| 6,421,083 B1 | * | 7/2002 | Takakura | 348/223.1 |
| 2003/0218677 A1 | * | 11/2003 | Nishimura | 348/223.1 |

FOREIGN PATENT DOCUMENTS

JP          05167914 A   *   7/1993   ......... H04N/05/235

* cited by examiner

Primary Examiner—Wendy R. Garber
Assistant Examiner—John M Villecco
(74) Attorney, Agent, or Firm—Sheridan Ross PC

(57) ABSTRACT

A solid-state imaging apparatus having a CCD image capturing circuit includes an exposure time control circuit which analyzes the image signal generated by the image capturing circuit and generates a control signal to adjust an image exposure time. A balance control circuit also receives the control signal and updates gain control information used by an image processing circuit that generates color difference data (U/V data) from the image signal.

7 Claims, 3 Drawing Sheets

US 6,768,511 B1

EXPOSURE CONTROL CIRCUIT FOR SOLID-STATE IMAGING APPARATUS

BACKGROUND OF THE INVENTION

The present invention relates to a solid-state imaging apparatus, and more particularly, to a solid-state imaging apparatus that performs exposure control and white balance control.

FIG. 1 is a block diagram showing the configuration of a conventional imaging apparatus 100 which uses a CCD image sensor, or CCD 1.

The CCD 1, which is a solid-state imaging device, has a plurality of light-receiving pixels, a plurality of vertical shift registers, and usually a horizontal shift register. The light-receiving pixels are arranged in a matrix form on a light-receiving surface at regular intervals and produce and store information charges corresponding to the image of a sensed object. The vertical shift registers are arranged to correspond to the columns of the light-receiving pixels and sequentially shift the information charges stored in the light-receiving pixels in the vertical direction. The horizontal shift register is arranged on the output side of the vertical shift registers and receives the information charges output from the vertical shift registers, and then transfers the information charges row by row. This allows the horizontal shift register to output an image signal A1 in accordance with the information charges stored in the light-receiving pixels.

When performing color image sensing, a color filter for color distribution is attached to the light-receiving surface in order to associate the individual light-receiving pixels of the CCD 1 with predetermined color components. There are stripe type and mosaic type color filters. Although the structure of the mosaic type color filter is more complicated than the stripe type color filter, the mosaic type filter has higher horizontal resolution. Thus, imaging apparatuses that require high resolution, such as a video camera, use mosaic type color filters.

A drive circuit 2 responds to various timing signals from a timing control circuit 3 and supplies a multi-phase drive clock to the shift registers of the CCD 1. For example, a 4-phase vertical transfer clock Φv is supplied to the vertical shift registers, and a 2-phase horizontal transfer clock Φh is supplied to the horizontal shift register. In accordance with a reference clock having a predetermined cycle, the timing control circuit 3 produces a vertical timing signal VD, which determines the vertical scan timing of the CCD 1, and a horizontal timing signal HD, which determines the horizontal scan timing, and supplies the timing signals to the drive circuit 2.

An analog processing circuit 4 performs a process, such as sampling and holding or level clamping, on the image signal A1 received from the CCD 1 to produce an image signal A2 which conforms to a predetermined format. For example, in the sample and hold process, only signal levels are extracted from the image signal A1, which has reset levels and signal levels alternately repeated in synchronism with the output operation of the CCD 1. In the level clamping process, a black reference level set at the end of the horizontal scanning period of the image signal A1 is clamped to a predetermined level every horizontal scanning period. An A/D converter circuit 5 quantizes the image signal A2 received from the analog processing circuit 4 to generate image data D3, which represents the information corresponding to each light-receiving pixel of the CCD 1 with a digital value.

A color computation circuit 6 receives the image data D3 from the A/D converter circuit 5, separates the data D3 into three color components, and generates color component data. The color computation circuit 6 further generates color data C4 corresponding to the three primary colors (R: red, G: green and B: blue) of light. For example, if the color filter has yellow (YE), cyan (Cy), green (G), and white (W) segments, the color component data C[Ye], C[Cy], C[G], and C[W] undergo color computation processes in accordance with the equations listed below to generate color data C4, which corresponds to the three primary colors of light.

$$Ye-G=R$$

$$Cy-G=B$$

$$G=G$$

A white balance circuit 7 assigns specific gains to each of the color components in order to adjust the balance of each color component and generate adjusted color data C5. In other words, the white balance circuit 7 compensates for differences in the sensitivities of the light-receiving pixels of the CCD 1 that depend on each color component and individually sets the gain of each color component to improve the color reproduction of a reproduced image.

A color difference computation circuit 8 performs a computation process on the adjusted color data C5 received from the white balance circuit 7 and generates color difference data U and V. The color difference computation circuit 8 combines the R, G, and B components of the adjusted color data at a ratio of 3:6:1 to generate luminance data. Then, the color difference computation circuit 8 subtracts the luminance data from the B component to generate the color difference data U, and the luminance data from the R component to generate the color difference data V.

A luminance computation circuit 9 combines the plurality of color components (in this case, four) included in the image data D3 to generate luminance data B4. That is, if the components Ye, Cy, G, W are combined, the following equation is obtained.

$$Ye + Cy + G + W = (B+G) + (R+G) + G + (R+G+B)$$

$$= 2R + 4G + 2B$$

This generates luminance data in which the R, G and B components are combined at a ratio of 1:2:1. While the NTSC standards define a luminance signal produced by combining the R, G and B components at a ratio of 3:6:1, a luminance signal produced by combining the components at a ratio close to this ratio does not cause a practical problem.

An outline correction circuit 10 emphasizes a specific frequency component included in the luminance data B4 to generate aperture data and adds the aperture data to the luminance data B4. In other words, to emphasize the image outline of a sensed object, the outline correction circuit 10 performs a filtering process on the luminance data B4 to emphasize a frequency component that is one fourth the sampling frequency of the image signal D3 output by the A/D converter circuit 5 and generate the aperture data. The luminance data B4 generated by adding the aperture data is provided as luminance data Y to an external display device or recording device together with the color difference data U and V.

The solid-state imaging apparatus 100 determines the exposure state based on the level of the image signal and feeds back the determination result to the timing control circuit 3. The timing control circuit 3 decreases and lengthens the exposure time of the CCD 1 based on the determination result to obtain an appropriate exposure time. The exposure time of the CCD 1 is the period between when the storing of the information charges starts to when the transmission of the information charges starts. Therefore, an appropriate amount of information charges may be stored in each light-receiving pixel by changing the time point for starting the storing of the information charges. Further, the gain of each color component is determined based on the average level of the image signal, and the determined gain is applied to the color component to perform white balance control.

During exposure control of the CCD 1, the exposure state is determined during each vertical scan period, and the exposure time of the CCD 1, or the shutter timing, is updated every vertical scan period. This enables the CCD 1 to follow changes in the luminance of the sensed object. In comparison, during white balance control, the color balance of the sensed object changes more gradually than the luminance of the sensed object. Thus, the gain set for each color component is updated in cycles that are longer than that of the exposure control.

When the imaging apparatus 100 is operated under a light source that emits light in a cyclic manner, flicker of the reproduced image does not occur theoretically as long as the imaging cycle and the light emission cycle of the light source is the same or have a relationship that can be obtained by multiplying an integer. However, if jitter is included in the cyclic light emission of the light source, a slight difference may be produced between the imaging cycle and the light emission cycle. This causes the level of the image signal to fluctuate. In such state, the exposure control conditions are updated during each vertical scan period. Thus, exposure control is substantially not affected by jitter. However, the white balance control has a higher possibility of being affected by jitter since the response of the white balance control is slower than that of the exposure control. Hence, when the exposure time of the CCD 1 becomes short, fluctuations of the signal level caused by jitter increase. This changes the color of the reproduced image in cycles determined by the jitter included in the light emission of the light source.

SUMMARY OF THE INVENTION

It is an object of the present invention to provide a solid-state imaging apparatus that performs exposure control and white balance control in a stable manner.

To achieve the above object, the present invention provides a solid-state imaging apparatus including a solid-state imaging device for accumulating information charges corresponding to an image of a sensed object and generating an image signal consisting of a plurality of color components. A drive circuit is connected to the solid-state imaging device to drive the solid-state imaging device so that the image signal is generated within a predetermined time period. A timing control circuit is connected to the drive circuit to provide a timing signal to the drive circuit. The timing signal determines a length of the predetermined time period. An exposure control circuit is connected to the imaging device and the timing control circuit to determine an exposure state of the imaging device based on the image signal in a first cycle and control the timing control circuit in order to shorten or lengthen the predetermined time period. A white balance circuit is connected to the imaging device and the exposure control circuit to perform a predetermined process on the plurality of color components of the image signal in a second cycle, which is longer than the first cycle, so that the plurality of color components are relatively balanced with one another. The white balance circuit performs the predetermined process in a third cycle that is shorter than the second cycle when the exposure control circuit determines that the exposure state is stable.

Another aspect of the present invention provides an imaging apparatus including an image sensor for capturing an image of a sensed object and generating an image signal thereof. An exposure control circuit receives the image signal, compares the image signal to predetermined upper and lower limit values, and calculates a control signal based on the comparison results. A timing control circuit is connected to the exposure control circuit and receives the control signal. The timing control circuit generates a plurality of timing signals for specifying a vertical scan period and a horizontal scan period of the image sensor based on the control signal. A balance control circuit is connected to the exposure control circuit to receives the control signal, generates gain information and provides the gain information to an image processing circuit of the imaging apparatus, so that a change in the exposure time caused by the control signal is matched with a corresponding change in gain information used to process the image signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 2:
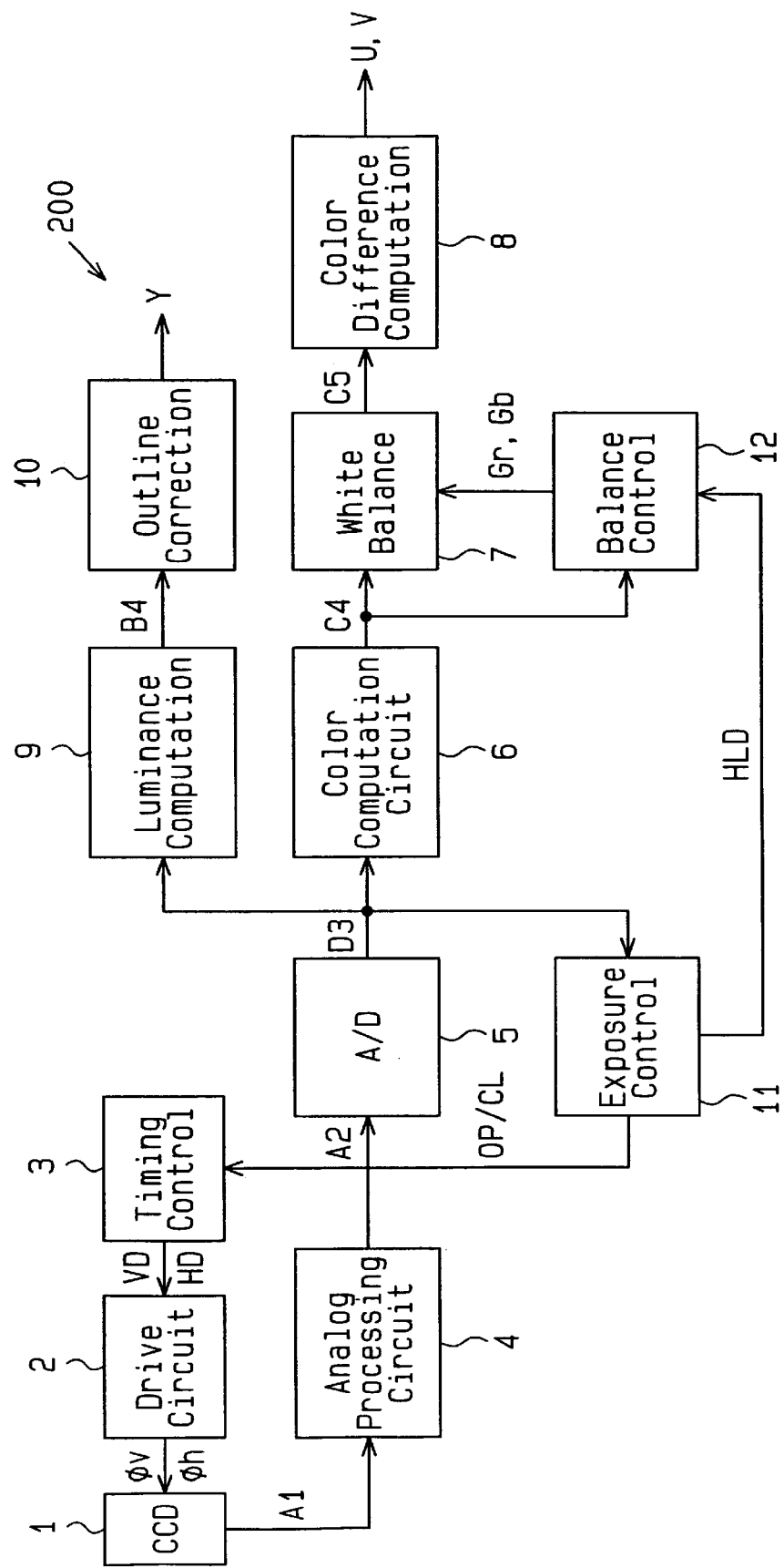
FIG. 2 is a schematic block diagram showing a solid-state imaging apparatus according to the present invention.

In the drawings, like numerals are used for like elements. FIG. 2 is a schematic block diagram showing a solid-state imaging apparatus 200 according to the present invention.

Figure 1:
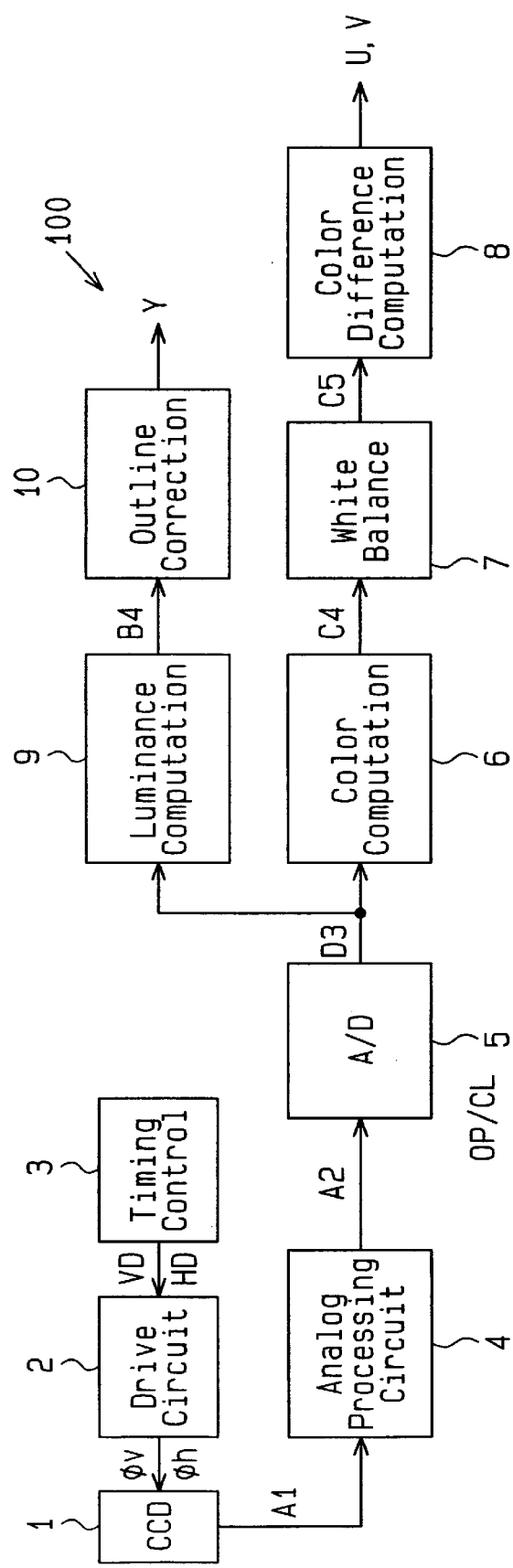
FIG. 1 is a schematic block diagram showing a prior art solid-state imaging apparatus.

The solid-state imaging apparatus 200 includes a CCD 1, a drive circuit 2, a timing control circuit 3, a timing control circuit 3, an analog processing circuit 4, an A/D converter circuit 5, a color computation circuit 6, a white balance circuit 7, a color difference computation circuit 8, a luminance computation circuit 9, an outline correction circuit 10, an exposure control circuit 11, and a balance control circuit 12. The drive circuit 2 drives the CCD 1 in accordance with an output signal from the timing control circuit 3. The CCD 1 generates an image signal A1. Various processes are carried out on the image signal A1 to generate a digital luminance signal Y and digital color difference signals U, V, as previously discussed with reference to FIG. 1.

The balance control circuit 12 changes the control information updating cycle in accordance with commands from the exposure control circuit 11. More specifically, the balance control circuit 12 shortens the control information updating cycle when the exposure control circuit 11 obtains an appropriate exposure state. This improves the response of the white balance control.

The exposure control circuit 11 receives the image signal D3 from the A/D converter circuit 5 and computes the average level of the image signal D3. Then, the exposure control circuit 11 determines the exposure state of the CCD 1 from the average level and activates one of an exposure enhancement signal (lengthening signal) OP, an exposure suppression signal (shortening signal) CL, and a hold signal HLD in accordance with the determined exposure state. If the average level of the image signal D3 is relatively low, the enhancement signal OP is activated since exposure is insufficient. If the average level of the image signal D3 is relatively high, the suppression signal CL is activated since exposure is excessive. The enhancement signal OP and the suppression signals CL are provided to the timing control circuit 3.

The timing control circuit 3 preferably includes an up/down counter (not shown), which stores the value of the information charge storing time (exposure time) of the CCD 1. The up/down counter performs an up count operation in response to the enhancement signal OP and a down count operation in response to the suppression signal CL. Therefore, the exposure time of the CCD 1 is increased by the enhancement signal OP and decreased by the suppression signal CL. When the level of the image signal D3 is appropriate, the hold signal HLD is activated and provided to the balance control circuit 12. Accordingly, the exposure control circuit 11 determines the level of the image signal D3 for each image and activates one of the enhancement signal OP, the suppression signal CL, and the hold signal HLD during each vertical scan period.

The balance control circuit 12 receives the color signal C4 from the color computation circuit 6 and computes the average level of each color component in the color signal C4. Further, the balance control circuit 12 computes a gain that matches the average level of a reference (criterion) color component with the average level of the other color components. For example, if the G component is used as the reference color component, the average level of the G component is divided by the average level of the R component to compute a gain Gr, which is applied to the R component. The average level of the G component is divided by the average level of the B component to compute a gain Gb, which is applied to the B component. The gains Gr, Gb are provided to the white balance circuit 7.

The balance control circuit 12 computes the average level of each color component in the color signal C4 for several images (e.g., eight images). Accordingly, the gains Gr, Gb provided to the white balance circuit 7 are updated every eight vertical scan periods. When the hold signal HLD generated by the exposure control circuit 11 is high, the balance control circuit 12 computes the average level of each color component in the color signal C4 for each image. Accordingly, the gains Gr, Gb are updated every scan period.

The balance control circuit 12 may control via feedback the white balance circuit 7 to balance each color component of the adjusted color data C5 by receiving the color data C5 from the white balance circuit 7. For example, if the G component is used as the reference color component, the balance control circuit 12 compares the average level of the G component with the average levels of the R and B components. Then, the balance control circuit 12 increases or decreases the gains Gr, Gb applied to the associated R and B components in accordance with the comparison result to match the average level of the G component with the average levels of the R and B components. In this case, the cycle for comparing the average level of the G component with those of the R and B components shifts between units of several images and units of single images in accordance with the hold signal.

In the solid-state imaging apparatus 200, the balance control circuit 12 controls the white balance circuit 7 by updating the gains Gr, Gb of the associated color components in the color signal C4 for every predetermined vertical scan period when the exposure time of the CCD 1 is decreased or increased. Accordingly, when the exposure time of the CCD 1 is changing, the white balance control response is slower than the exposure control response. When the exposure state is stabilized by the exposure control and the exposure time of the CCD 1 is maintained, the balance control circuit 12 updates the gains Gr, Gb of the associated color components in the color signal C4 every vertical scan period. Accordingly, when the exposure state of the CCD 1 is in a stable state, the response for white balance control is quicker. Therefore, the white balance control is performed within a short period of time without adversely affecting the color balance even if the color of the sensed object changes in a sudden manner. This maintains a stable imaging state and avoids cyclic changes in the color of the reproduced image. In other words, if jitter is included in the cyclic light emission of the light source illuminating the sensed object, the frequently performed white balance control prevents the jitter from affecting the appearance of the image.

Figure 3:
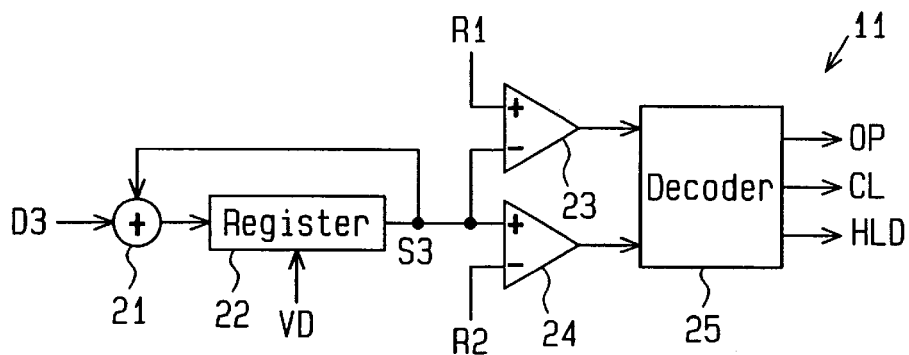
FIG. 3 is a schematic block diagram showing an exposure control circuit of the solid-state imaging apparatus of FIG. 2.

FIG. 3 is a schematic block diagram showing the exposure control circuit 11, which includes an adder 21, a register 22, first and second comparators 23, 24, and a determination circuit, or decoder 25. The adder 21 and the register 22 form an integrating circuit.

The adder 21 adds the image signal D3 from the A/D converter circuit 5 to an accumulated sum value S3, which is stored in the register 22, and provides the resulting sum to the register 22, which holds the sum. Further, the register 22 is reset in response to a vertical timing signal VD. Thus, the register 22 stores the accumulated sum value S3 of the image signal D3 during a single vertical scan period. As will be understood by those of skill in the art, the register 22 may comprise a pair of registers connected in series to prevent a race condition.

The first comparator 23 compares the accumulated sum value S3, which is held in the register 22, with a reference value R1, which corresponds to the upper limit of an appropriate exposure range, and sends the comparison result to the decoder 25. The second comparator 24 compares the accumulated sum value S3 with a reference value R2, which corresponds to the lower limit of the appropriate exposure range, and sends the comparison result to the decoder 25. The decoder 25 decodes the comparison results of the first and second comparators 23, 24 and activates one of the exposure enhancement signal OP, the exposure suppression signal CL, and the hold signal HLD. For example, the exposure suppression signal CL is activated when the accumulated sum value S3 exceeds the reference value Rl, and the exposure enhancement signal CL is activated when the accumulated sum value S3 is lower than the reference value R2. The hold signal HLD is activated when the accumulated sum value S3 is between the reference values 2 and R1.

Figure 4:
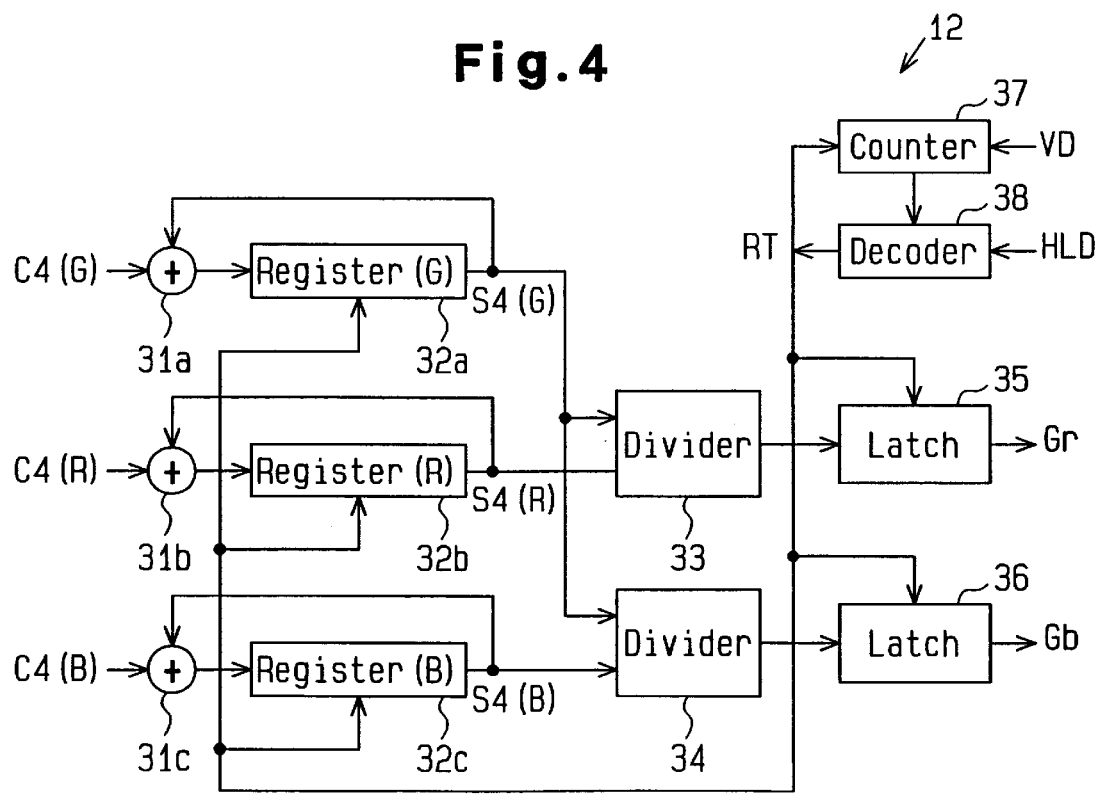
FIG. 4 is a schematic block diagram showing a balance control circuit of the solid-state imaging apparatus of FIG. 2.

FIG. 4 is a schematic block diagram showing the balance control circuit 12, which includes three adders 31a, 31b, 31c, three registers 32a, 32b, 32c, two dividers 33, 34, two latch circuits 35, 36, a counter 37, and a decoder 38. The adders 31a–c and the dividers 33, 34 form integrating circuits.

The adders 31a–31c add the color components C4(G), C4(R), C4(B) of the color signal C4 to the accumulated sum values stored in the registers 32a–32c, respectively. The registers 32a–32c receive and store the sums from the associated adders 32a–32c. Further, the registers 32a–32c are reset by a reset signal RT. Accordingly, the registers 31a–31c store the accumulated sum values S4(G), S4(R), S4(B) of the corresponding color components C4(G), C4(R), C4(B) in the color signal C4 during a single cycle of the reset signal RT. Like the register 22, the registers 32a–32c may comprise pairs of series connected registers.

The divider 33 divides the accumulated sum value S4 (G) stored in the register 32a with the accumulated sum value S4 (R) stored in the register 32b and provides the divided result to the latch circuit 35. The divider 34 divides the accumulated sum value S4(G) stored in the register 32a with the accumulated sum value S4(B) stored in the register 32c and provides the divided result to the latch circuit 36. The latch circuits 35, 36 latch the divided results from the associated dividers 33, 34 in accordance with the reset signal RT generated by the decoder 38. Thus, the latch circuit 35 maintains the gain Gr applied to R component of the color signal C4 so that the average level of the R component matches the average level of the G component. The latch circuit 36 maintains the gain Gb applied to the B component of the color signal C4 so that the average level of the B component matches the average level of the G component.

The counter 37 performs a count operation in response to the vertical timing signal VD and provides a count value to the decoder 38. The counter 37 is reset by the reset signal RT. The decoder 38 decodes the count value from the counter 37 to generate the reset signal RT, which has a cycle obtained by multiplying the cycle of the vertical timing signal VD with an integer. Further, the decoder 38 changes the cycle of the reset signal RT in response to the hold signal HLD from the exposure control circuit 11. When the hold signal HLD is high, the cycle of the reset signal RT generated by the decoder 38 is relatively short. For example, when the hold signal HLD is low, the reset signal RT is generated by dividing the vertical timing signal VD into eight cycles. When the hold signal HLD is high, the vertical timing signal VD is directly output as the reset signal RT. Accordingly, if the hold signal HLD is not high, the gains Gr, Gb are recalculated every predetermined vertical scan period (e.g., every eighth vertical scan period), and if the hold signal HLD is high, the gains Gr, Gb are updated every vertical scan period.

The dividers 33, 34 of FIG. 4 may be replaced by comparators when setting the gain of each color component in accordance with the adjusted color data C5 output by the white balance circuit 7. In this case, the gains Gr, Gb are increased and decreased in constant steps based on the comparison results. Furthermore, when the hold signal HLD is high, the average level of each of the color components C4(G), C4(R), C4(B) in the color signal C4 is updated at cycles that are shorter than when the hold signal HLD is low.

It should be apparent to those skilled in the art that the present invention may be embodied in many other specific forms without departing from the spirit or scope of the invention. Particularly, it should be understood that the present invention may be embodied in the following forms.

The updating cycle of the control information of the exposure control circuit 11 and the updating cycle of the control information of the balance control circuit 12 when the hold signal HLD is high are not limited to a single vertical scan period and may be two or more times longer than a single vertical scan period. In this case, when the hold signal HLD is low, the updating cycle of the control information of the balance control circuit 12 must be longer than the predetermined vertical scan periods (e.g., eight vertical scan periods).

The present examples and embodiments are to be considered as illustrative and not restrictive, and the invention is not to be limited to the details given herein, but may be modified within the scope and equivalence of the appended claims.

What is claimed is:

1. A solid-state imaging apparatus comprising:

a solid-state imaging device for accumulating information charges corresponding to an image of a sensed object and generating an image signal consisting of a plurality of color components;

a drive circuit connected to the solid-state imaging device to drive the solid-state imaging device so that the image signal is generated within a predetermined time period;

a timing control circuit connected to the drive circuit to provide a timing signal to the drive circuit, wherein the timing signal determines a length of the predetermined time period;

an exposure control circuit, connected to the imaging device and the timing control circuit, to determine an exposure state of the imaging device based on the image signal in a first cycle and control the timing control circuit in order to shorten or lengthen the predetermined time period; and a white balance circuit, connected to the imaging device and the exposure control circuit, to perform a predetermined process on the plurality of color components of the image signal in a second cycle, which is longer than the first cycle, so that the plurality of color components are relatively balanced with one another, wherein the white balance circuit performs the predetermined process in a third cycle that is shorter than the second cycle when the exposure control circuit determines that the exposure state is stable.

2. The solid state imaging apparatus according to claim 1, wherein the third cycle is the same as the first cycle.

3. The solid-state imaging apparatus according to claim 1, wherein the solid-state imaging device generates the image signal in correspondence with a screen during the predetermined time period, and wherein the exposure control circuit includes:

an integrating circuit for integrating the image signal screen by screen to generate an integrated value;

a comparing circuit connected to the integrating circuit to compare the integrated value with an upper limit value and a lower limit value of an appropriate exposure state in order to generate a comparison signal; and a determination circuit connected to the comparing circuit to activate one of a lengthening signal, a shortening signal, and a hold signal, wherein the determination circuit activates the shortening signal when the integrated value is higher than the upper limit value, the lengthening signal when the integrated value is lower than the lower limit value, and the hold signal when the integrated value is between the upper and lower limit values.

4. The solid state imaging apparatus according to claim 3, wherein the white balance circuit performs the predetermined process in the third cycle when the hold signal from the determination circuit is activated.

5. The solid-state imaging apparatus according to claim 3, wherein the predetermined process includes applying a gain to the plurality of color components of the image signal, and wherein the white balance circuit includes:
- a plurality of integrating circuits for generating a plurality of integrated values by integrating each of the plurality of color components of the image signal;
- a computation circuit connected to the plurality of integrating circuits to generate a plurality of gains that are selectively applied to the plurality of color components from the plurality of integrated values; and
- a plurality of latch circuits connected to the computation circuit to hold the plurality of gains.

6. The solid-state imaging apparatus according to claim 5, wherein the white balance circuit further includes a decoder connected to the plurality of latch circuits to generate a reset signal having a predetermined cycle set in response to the hold signal from the determination circuit, wherein the reset signal resets the plurality of latches so that the plurality of gains are recalculated.

7. The solid-state imaging apparatus according to claim 6, wherein the plurality of integrating circuits generate the plurality of integrated values in accordance with the reset signal.

* * * * *